United States Patent
Polynkin et al.

(10) Patent No.: US 7,177,496 B1
(45) Date of Patent: Feb. 13, 2007

(54) OPTICAL SPECTRAL POWER MONITORS EMPLOYING TIME-DIVISION-MULTIPLEXING DETECTION SCHEMES

(75) Inventors: Pavel G. Polynkin, Fremont, CA (US); Mark H. Garrett, Morgan Hill, CA (US); Jeffrey P. Wilde, Morgan Hill, CA (US)

(73) Assignee: Capella Photonics, Inc., San Jose, CA (US)

( * ) Notice: Subject to any disclaimer, the term of this patent is extended or adjusted under 35 U.S.C. 154(b) by 186 days.

(21) Appl. No.: 10/033,549

(22) Filed: Dec. 27, 2001

(51) Int. Cl.
*G02B 6/00* (2006.01)
(52) U.S. Cl. .......................... 385/24; 385/18
(58) Field of Classification Search ............... 356/330, 356/327, 329; 385/24, 18; 359/128, 130; 398/87
See application file for complete search history.

(56) References Cited

U.S. PATENT DOCUMENTS

| | | | |
|---|---|---|---|
| 3,090,278 A * | 5/1963 | Saunderson | 356/329 |
| 5,483,335 A * | 1/1996 | Tobias | 356/310 |
| 5,504,575 A * | 4/1996 | Stafford | 356/330 |
| 5,784,158 A * | 7/1998 | Stanco et al. | 356/326 |
| 6,046,808 A * | 4/2000 | Fateley | 356/330 |
| 6,097,859 A * | 8/2000 | Solgaard et al. | 385/17 |
| 6,177,992 B1 * | 1/2001 | Braun et al. | 356/327 |
| 6,222,954 B1 * | 4/2001 | Riza | 385/18 |
| 6,249,346 B1 * | 6/2001 | Chen et al. | 356/328 |
| 6,263,123 B1 * | 7/2001 | Bishop et al. | 385/15 |
| 6,396,053 B1 * | 5/2002 | Yokoi | 250/234 |
| 6,421,179 B1 * | 7/2002 | Gutin et al. | 359/572 |
| 6,507,685 B1 * | 1/2003 | Polynkin et al. | 385/37 |
| 6,636,306 B2 * | 10/2003 | He et al. | 356/327 |

OTHER PUBLICATIONS

PCT Search Report dated Apr. 11, 2003 corresponding to PCT/US02/39137 filed on Dec. 9, 2002.
PCT Written Opinion dated Oct. 23, 2003 corresponding to PCT US/02/39137.

* cited by examiner

*Primary Examiner*—Rodney Bovernick
*Assistant Examiner*—M. Stahl
(74) *Attorney, Agent, or Firm*—DLA Piper US LLP

(57) ABSTRACT

The present invention provides a method and apparatus for optical spectral power monitoring that employ a time-division-multiplexed detection scheme. The optical spectral power monitoring apparatus of the present invention uses a wavelength-dispersing means such as a diffraction grating to separate a multi-wavelength optical signal into multiple spectral channels and an array of beam-manipulating elements positioned to correspond with the spectral channels. The beam-manipulating elements are individually controllable so as to direct the spectral channels into an optical detector in a time-division-multiplexed sequence. The optical spectral power monitoring apparatus may further employ a polarization diversity scheme, thereby becoming polarization insensitive. This enables the apparatus of the present invention to enhance spectral resolution, while providing improved accuracy in optical spectral power detection. Accordingly, a variety of novel optical spectral power monitors can be constructed according to the present invention, that are well suitable for WDM optical networking applications.

33 Claims, 6 Drawing Sheets

OPTICAL SPECTRAL POWER MONITORS EMPLOYING TIME-DIVISION-MULTIPLEXING DETECTION SCHEMES

FIELD OF THE INVENTION

This invention relates generally to optical spectral monitors and analyzers. More specifically, it relates to novel types of optical spectral monitors employing time-division-multiplexing detection schemes, which are suitable for WDM optical networking applications.

BACKGROUND

As optical communication networks employing wavelength division multiplexing (WDM) become increasingly pervasive, a new line of optical performance monitors, including spectral power monitors, is in demand.

Conventional spectral power monitors in the art typically use a wavelength-dispersing means, such as a diffraction grating or a dispersing prism, to separate a multi-wavelength optical signal into a spatial array of spectral channels with distinct center wavelengths. An array of photo-detectors (e.g., photodiodes) is positioned to detect the spectral channels individually, thereby providing an optical power spectrum of the multi-wavelength optical signal. Alternatively, a rotating diffraction grating and a stationary photo-detector, or a movable photo-detector and a stationary diffraction grating, are used to scan the spectral channels sequentially. These prior spectral power monitors are typically high in cost, cumbersome in size and operation, and in some instances require considerable maintenance, rendering them unsuitable for optical networking applications.

Moreover, the diffraction efficiency of a diffraction grating is known to be characteristically polarization sensitive. Such polarization sensitivity may be particularly acute for high-dispersion diffraction gratings (e.g., holographic gratings), which are desired for providing enhanced spectral resolution in spectral power monitors.

In view of the foregoing, there is a need in the art for optical spectral power monitors that overcome the shortcomings of the prior devices in a simple, effective, and economical construction.

SUMMARY OF THE INVENTION

The present invention provides a method and apparatus for optical spectral power monitoring that employ a novel time-division-multiplexed detection scheme. The optical spectral power monitoring apparatus of the present invention comprises an input port for a multi-wavelength optical signal; a wavelength-disperser for separating the multi-wavelength optical signal by wavelength into multiple spectral channels having a predetermined relative arrangement; and a plurality of beam-manipulating elements positioned to correspond with the spectral channels. The beam-manipulating elements are individually controllable so as to direct the spectral channels into an optical detector in a time-division-multiplexed sequence.

In the present invention, the term "time-division-multiplexed sequence" refers to a particular temporal order in which the spectral channels are manipulated, e.g., directed into an optical detector. For example, the spectral channels may be directed into the optical detector sequentially (i.e., one-by-one) in a consecutive or other predetermined sequence, whereby an optical power spectrum (optical power level as a function of wavelength) can be derived. The spectral channels may also be grouped into spectral sets according to a predetermined scheme, each containing one or more spectral channels. The beam-manipulating elements corresponding to each spectral set may then be coordinated to direct the constituent spectral channels into the optical detector concurrently, thereby providing for an integrated signal of these spectral channels. The sequence by which the spectral sets are directed onto the optical detector may be according to any desired time-division-multiplexed scheme. Moreover, a subset of the spectral channels (e.g., the "even-numbered" or "odd-numbered" spectral channels) may be selected on a predetermined or dynamic basis, and monitored in a time-division-multiplexed sequence, if so desired in an application. Additionally, the detection time allocated for each spectral channel (or spectral set) may be fixed, or dynamically controlled on a channel-by-channel (e.g., wavelength-by-wavelength) basis.

In the present invention, a "spectral channel" is characterized by a distinct center wavelength and associated bandwidth, and may carry a unique information signal as in WDM optical networking applications. A beam-manipulating element should be construed to embody any element that is capable of manipulating at least one spectral channel by way of deflecting, switching, or modulating. As a way of example, a beam-manipulating element may be a micromirror that is movable, e.g., pivotable about at least one axis. A beam-manipulating element may also be a liquid crystal shutter-element, an MEMS (micro-electro-mechanical-system) shutter-element, or any other optical shutter known in the art that opens, or remains closed, to an incident optical beam by way of a suitable actuation/control means.

The optical spectral power monitoring apparatus of the present invention may further employ a polarization diversity scheme, so as to overcome polarization-sensitive effects the constituent optical elements may possess. In this case, a polarization-separating element and a polarization-rotating element may be disposed along the optical path between the input port and the wavelength-disperser, serving to decompose the input multi-wavelength optical signal into first and second polarization components and subsequently rotate the polarization of the second polarization component by 90-degrees. The wavelength-disperser separates the incident optical signals by wavelength into first and second sets of optical beams, respectively. A beam-focuser (e.g., a focusing lens) may focus the first and second sets of optical beams into corresponding focused spots, impinging onto the beam-manipulating elements. The first and second optical beams associated with the same wavelength may impinge onto (and be manipulated by) the same beam-manipulating element. By operating the beam-manipulating elements according to a desired time-division-multiplexed scheme, the first and second optical beams associated with each wavelength may be successively directed into the optical detector, whereby an optical power spectrum of the input multi-wavelength optical signal can be derived. Alternatively, the first and second sets of optical beams may be directed respectively into first and second optical detectors in a manner that causes the optical beams in each set to arrive at the corresponding optical detector in a time-division-multiplexed sequence. This enables an optical power spectrum associated with each polarization component in the input multi-wavelength optical signal to be separately derived, which would be desirable in WDM optical networking applications.

The optical spectral power monitoring apparatus of the present invention may further include one or more reference signals and corresponding reference-position-sensing elements, along with one or more appropriate alignment-adjusting elements, for monitoring the alignment between the spectral channels and the respective beam-manipulating elements and correcting for misalignment that may arise over the course of operation.

In the present invention, the wavelength-disperser may generally be a ruled diffraction grating, a holographic grating, an echelle grating, a curved diffraction grating, a transmission grating, a dispersing prism, or other types of wavelength-separating means known in the art. The input port may be a fiber collimator, coupled to an input fiber transmitting the multi-wavelength optical signal. The polarization-separating element may be a polarizing beam splitter, a birefringent beam displacer, or other types of polarization separating means known in the art. The polarization-rotating element may be a half-wave plate, a Faraday rotator, a liquid crystal rotator, or any other polarization-rotating means known in the art that is capable of rotating the polarization of an optical beam by a prescribed angle (e.g., 90-degrees). An optical detector may be a PN photo detector, PIN photo detector, an avalanche photo detector (APD), or other types of optical power sensing means known in the art.

By advantageously utilizing an array of beam-manipulating elements that correspond with multiple spectral channels on an individual basis, optical spectral power sensing can be performed in a variety of time-division-multiplexed schemes according to the present invention. This renders greater versatility to the optical spectral power monitoring apparatus thus constructed, in distinct contrast with prior spectral power monitors. Furthermore, the aforementioned polarization diversity scheme renders polarization-sensitive effects inconsequential in the optical spectral power monitoring apparatus of the present invention. This enables the apparatus of the present invention to enhance spectral resolution in a simple and cost-effective construction (e.g., by making use of high-dispersion diffraction gratings commonly available in the art), while providing improved accuracy in optical spectral power detection. Accordingly, a new line of optical spectral power monitors can be constructed according to the present invention, suitable for a variety of applications.

The novel features of this invention, as well as the invention itself, will be best understood from the following drawings and detailed description.

DETAILED DESCRIPTION

Figure 1:
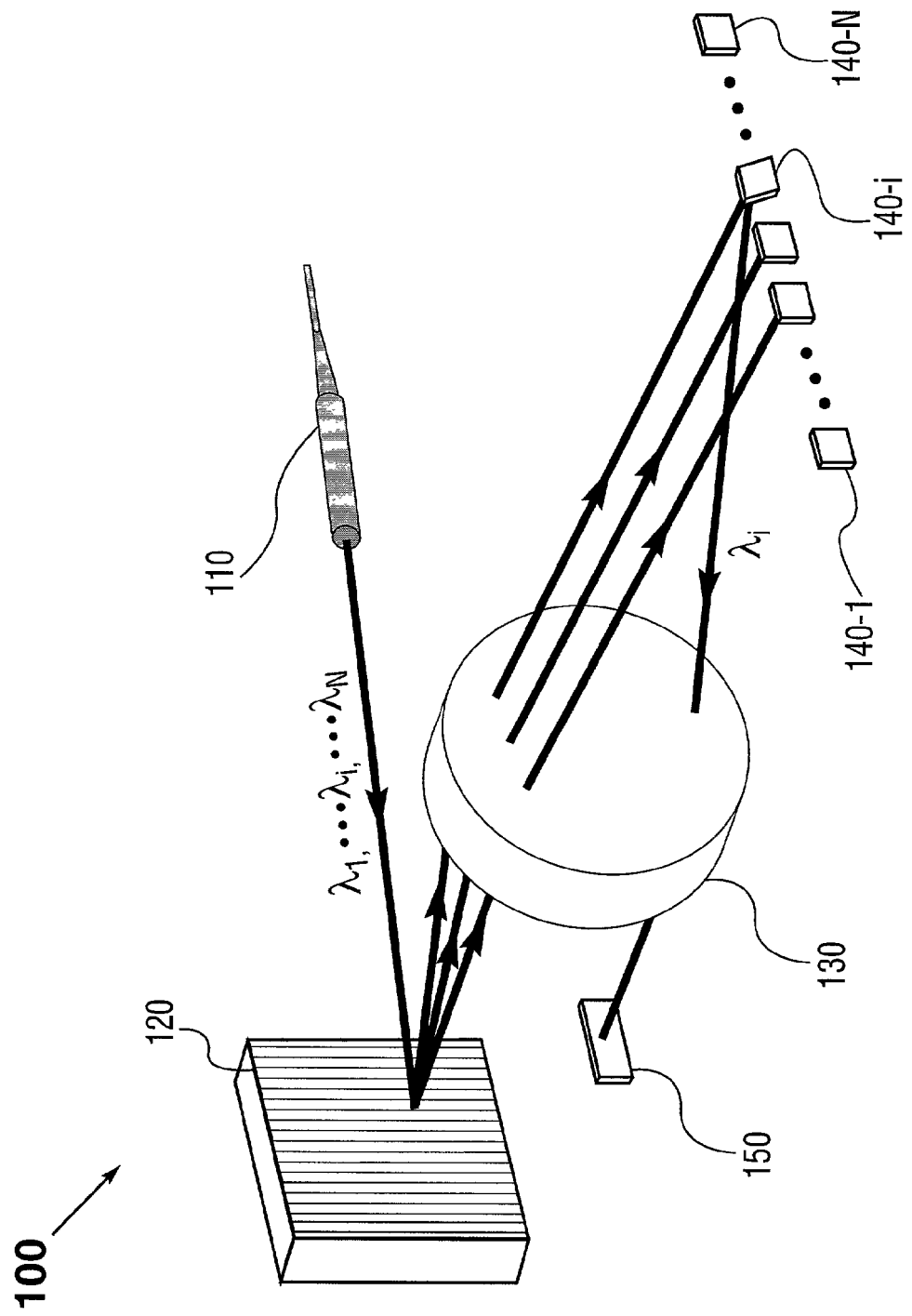
FIG. 1 depicts a first embodiment of an optical spectral power monitoring apparatus of the present invention, employing an array of micromirrors as the beam-manipulating elements and a single input port.

FIG. 1 shows a perspective view of a first embodiment of an optical spectral monitoring apparatus according to the present invention. By way of example to illustrate the general principles of the present invention, optical spectral power monitoring apparatus 100 comprises an input port 110 which may be a fiber collimator; a wavelength-disperser 120 which in one form may be a diffraction grating; a beam focuser 130 which may be a focusing lens; and an array of beam-manipulating elements 140 which in one form may be micromirrors 140-1 through 140-N. The optical spectral monitoring apparatus 100 may further include an optical detector 150, which may be a photodiode in conjunction with an associated detection circuit.

For purposes of illustration and clarity, only a select few (e.g., three) of the spectral channels, along with the input multi-wavelength optical signal, are graphically illustrated in FIG. 1 and the following figures. It should be noted, however, that there can be any number of the spectral channels in an optical spectral power monitoring apparatus of the present invention (so long as the number of spectral channels is commensurate with the number of beam-manipulating elements employed in the system). It should also be noted that various elements and optical beams in FIG. 1A and the following figures are shown for illustrative purposes, and therefore may not be drawn to scale.

In operation, the input port 110 transmits a multi-wavelength optical signal (which may contain wavelengths $\lambda_1$ through $\lambda_N$, for instance). The diffraction grating 120 angularly separates the multi-wavelength optical signal by wavelength into multiple spectral channels (e.g., characterized respectively by wavelengths $\lambda_1$ through $\lambda_N$), having a predetermined relative arrangement. The focusing lens 130 may focus the spectral channels into corresponding focused spots, e.g., in a spatial array with the predetermined relative arrangement. The micromirrors 140-1 through 140-N may be positioned such that each micromirror receives a unique one of the spectral channels. The micromirrors 140-1 through 140-N may be individually controllable and movable (e.g., pivotable or rotatable), so as to direct the respective spectral channels into the optical detector 150 in a time-division-multiplexed sequence. This enables an optical power spectrum (i.e., optical power level as a function of wavelength) of the input multi-wavelength signal to be derived.

In the present invention, a "spectral channel" is characterized by a distinct center wavelength and associated bandwidth, and may carry a unique information signal as in WDM optical networking applications. The term "time-division-multiplexed sequence" refers to a particular temporal order in which the spectral channels are manipulated, e.g., directed into an optical detector. For example, the spectral channels may be directed into the optical detector 150 sequentially (i.e., one-by-one) in a consecutive or other predetermined sequence. The spectral channels may also be grouped into spectral sets according to a predetermined or dynamic scheme, each containing one or more spectral channels. The beam-manipulating elements corresponding to each spectral set may then be orchestrated to direct the constituent spectral channels into the optical detector concurrently, thereby providing for an integrated signal of these spectral channels. The sequence by which the spectral sets are directed onto the optical sensor may be according to any desired time-division-multiplexed scheme. Moreover, a subset of the spectral channels (e.g., the "even-numbered" or "odd-numbered" spectral channels) may be selected on a predetermined or dynamic basis, and monitored in a time-division-multiplexed sequence, if so desired in an application. Additionally, the detection time allocated for each spectral channel (or spectral set) may be fixed, or dynamically controlled on a channel-by-channel (e.g., wavelength-by-wavelength) basis.

In the embodiment of FIG. 1, the micromirrors 140-1 through 140-N may be silicon micromachined mirrors, reflective ribbons (or membranes), or other types of beam-deflecting elements known in the art. Each micromirror may be pivoted about one or two axes. The underlying fabrication techniques for micromachined mirrors are known in the art. The associated control system for actuating and controlling the micromirrors 140-1 through 140-N is also known to those skilled in the art, and hence is not explicitly shown in FIG. 1.

It will be appreciated that one or more additional optical detectors may be employed in the embodiment of FIG. 1, and correspond with the micromirrors according to a predetermined or dynamic scheme, if so desired in a practical application. For instance, in the event that a selected group of the spectral channels (e.g., the "even-numbered" or "odd-numbered" spectral channels) is desired to be monitored concurrently, a plurality of optical detectors may be accordingly implemented in a one-to-one correspondence with the micromirrors that are directing the selected spectral channels.

Figure 2:
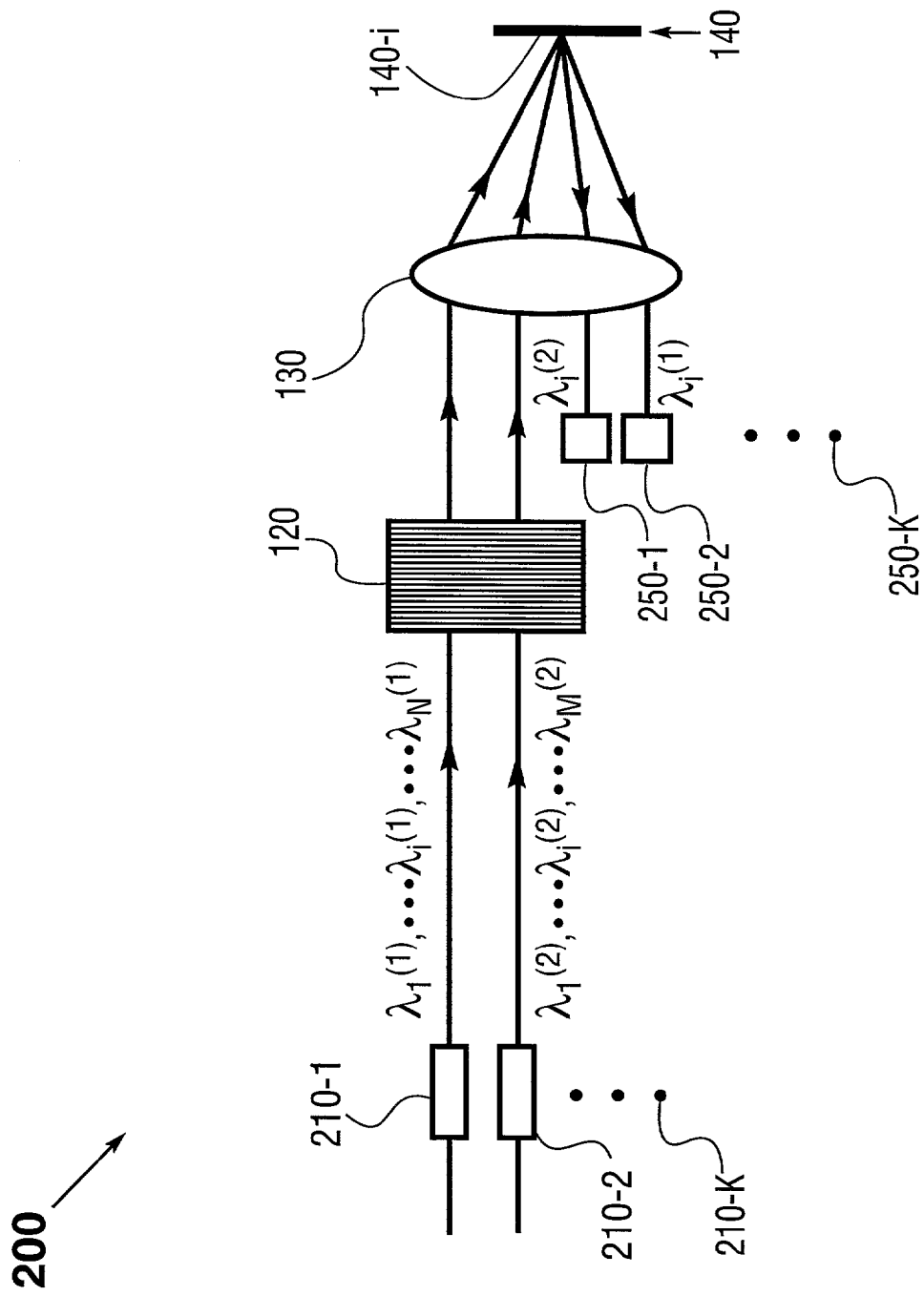
FIG. 2 shows a second embodiment of an optical spectral power monitoring apparatus of the present invention, employing an array of micromirrors as the beam-manipulating elements and a plurality of input ports.

The embodiment of FIG. 1 may be further extended to provide optical spectral power monitoring of a plurality of input multi-wavelength optical signals. Depicted in FIG. 2 is a schematic side view of a second embodiment of an optical spectral power monitoring apparatus of the present invention, pertaining to this situation. (The schematic side and top views in FIG. 2 and the following figures are presented with respect to the perspective view of FIG. 1). By way of example, optical spectral power monitoring apparatus 200 of FIG. 2 may make use of the architecture along with a number of the elements used in FIG. 1, as indicated by those elements labeled with identical numerals. This embodiment implements a plurality of input ports 210-1 through 210-K (K≧2), which may be in the form of fiber collimators. Each input port may transmit an optical signal. As a way of example, a first input port 210-1 may transmit a first multi-wavelength optical signal containing wavelengths $\lambda_1^{(1)}$ through $\lambda_N^{(1)}$, and a second input port 210-2 may transmit a second multi-wavelength optical signal containing wavelengths $\lambda_1^{(2)}$ through $\lambda_M^{(2)}$ (e.g., M≦N), where $\lambda_i^{(1)}$ and $\lambda_i^{(2)}$ (i=1 through M) may be substantially the same (i.e., the superscript associated with each wavelength is merely for identifying the input port from which the corresponding optical beam emerges). The diffraction grating 120 subsequently separates each multi-wavelength optical signal by wavelength into constituent spectral channels. The focusing lens 130 may focus the spectral channels into corresponding focused spots, impinging onto the array of micromirrors 140. The spectral channels (e.g., $\lambda_i^{(1)}$ and $\lambda_i^{(2)}$) characterized by the same wavelength may impinge onto the same micromirror (e.g., the micromirror 140-i). For the sake of illustration and clarity, the micromirror 140-i is explicitly identified in FIG. 2, whereas the micromirror array as a whole is indicated by the numeral 140.

Consider the aforementioned spectral channels $\lambda_i^{(1)}$, $\lambda_i^{(2)}$ as a way of example to illustrate the general operation principle of the embodiment of FIG. 2. The spectral channels $\lambda_i^{(1)}$, $\lambda_i^{(2)}$ may be incident onto the micromirror 140-i at different angles of incidence, given that they originate from two different input ports, e.g., the first and second input ports 210-1, 210-2, respectively. Consequently, the spectral channels $\lambda_i^{(1)}$, $\lambda_i^{(2)}$ are reflected from the micromirror 140-i at different angles of reflection, thereby impinging onto two separate optical detectors, e.g., first and second optical detectors 250-1, 250-2, respectively. It will be appreciated that the number of optical detectors (e.g., the optical detectors 250-1 through 250-K) implemented in this embodiment may be commensurate with the number of input ports (e.g., the input ports 210-1 through 210-K) employed, whereby the spectral channels reflected by each micromirror are separately received by the respective optical detectors. Moreover, the micromirrors 140 may be operated to direct the corresponding spectral channels into the respective optical detectors in a time-division-multiplexed sequence, e.g., in a manner substantially similar to that described with respect to FIG. 1. As such, an optical power spectrum associated with each input multi-wavelength signal can be separately obtained in the optical spectral power monitoring apparatus 200.

Figure 3:
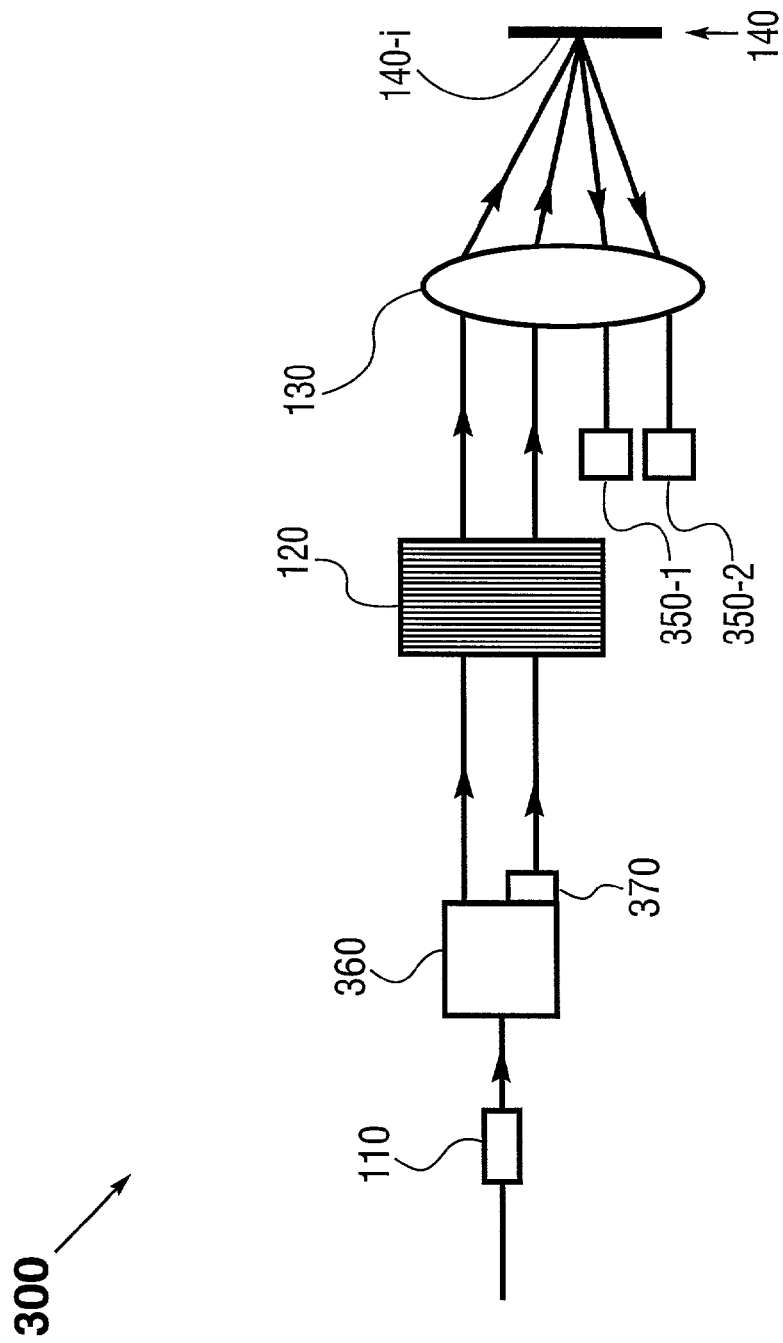
FIG. 3 depicts a third embodiment of an optical spectral power monitoring apparatus of the present invention, employing an array of micromirrors as the beam-manipulating elements in a polarization diversity scheme.

It is known that the diffraction efficiency of a diffraction grating may be polarization-dependent. For instance, the diffraction efficiency of a grating in a standard mounting configuration may be higher for p (or TM) polarization that is perpendicular to the groove lines on the grating than for s (or TE) polarization that is orthogonal to p-polarization, or vice versa. Such polarization-sensitive effects may become appreciable for a grating with a large number of groove lines (per unit length). Hence, in applications where the polarization-sensitive effects are deemed undesirable, a polarization diversity scheme may be implemented in the present invention. FIG. 3 depicts a schematic side view of a third embodiment of an optical spectral power monitoring apparatus of the present invention, employing an array of micromirrors as the beam-manipulating elements in a polarization diversity scheme.

By way of example, optical spectral power monitoring apparatus 300 of FIG. 3 may make use of the general architecture as well as a number of the elements used in the embodiment of FIG. 1, as indicated by those elements labeled with identical numerals. In this case, the input port 110 transmits a multi-wavelength optical signal (which may contain wavelengths $\lambda_1$ through $\lambda_N$, for instance). A polarization-separating element 360 may decompose the input multi-wavelength optical signal into a p-polarization component and an s-polarization component (or first and second polarization components). As a way of example, assuming that p-polarization is the preferred direction of the diffraction grating 120 (i.e., the diffraction efficiency is higher for the p-polarization component than for the s-polarization component), the s-polarization component may then be rotated by 90-degrees by way of a polarization-rotating element 370, whereby the optical signals incident onto the diffraction grating 120 all possess p-polarization. The diffraction grating 120 subsequently separates the incident optical signals by wavelength respectively into first and second sets of 115 optical beams (wherein each group may contain optical beams with wavelengths $\lambda_1$ through $\lambda_N$, for instance). Note that the first or second set of optical beams are dispersed in a direction substantially perpendicular to the plane of paper, hence not explicitly shown in the side view of FIG. 3. The focusing lens 130 may focus the optical beams into corresponding focused spots, impinging onto the array of micromirrors 140. For instance, the first and second optical beams associated with the same wavelength (e.g., $\lambda_i$) may impinge onto the same micromirror (e.g., the micromirror 140-$i$), at different angles of incidence. (For the sake of illustration and clarity, the micromirror 140-$i$ is explicitly identified in FIG. 3, whereas the micromirror array as a whole is indicated by the numeral 140.) Consequently, the first and second optical beams associated with each wavelength are reflected from the corresponding micromirror at different angles of reflection, thereby impinging onto first and second optical detectors 350-1, 350-2, respectively. Thus, by operating the micromirrors 140 according to a desired time-division-multiplexed scheme (e.g., in a manner substantially similar to that described with respect to FIG. 1), the first and second optical beams associated with each wavelength may be successively directed into the respective first and second optical detectors 350-1, 350-2. As such, an optical power spectrum associated with each polarization component in the input multi-wavelength signal can be separately obtained in the optical spectral power monitoring apparatus 300. This enables the apparatus 300 to enhance spectral resolution, while providing improved accuracy in optical spectral power detection.

Alternatively, the first and second optical beams associated with the same wavelength may be directed into a single optical detector in the embodiment of FIG. 3. This provides a "combined" optical power spectrum of the input multi-wavelength optical signal.

It should be appreciated that in this specification and appending claims, the rotation in polarization produced by a polarization-rotating element (e.g., the polarization-rotating element 370) may be construed as having slight variations about a prescribed angle (e.g., 90-degrees), due to imperfections that may exist in a practical system. Such variations, however, will not significantly affect the overall performance of the invention.

Figure 4A:
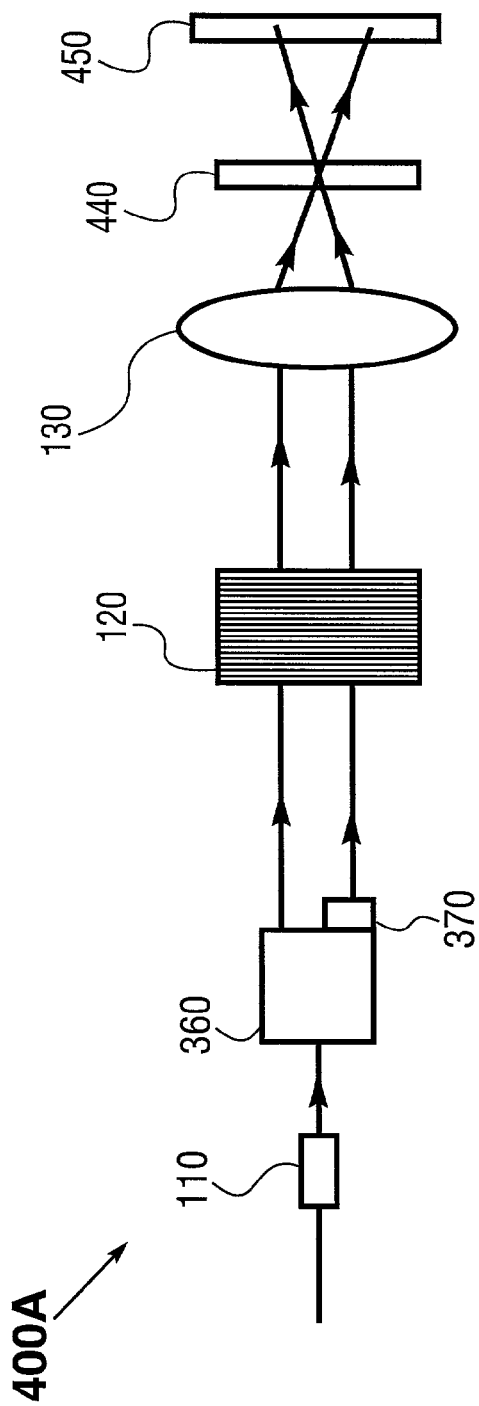
FIGS. 4A–4B show a fourth embodiment of an optical spectral power monitoring apparatus of the present invention, employing an array of liquid crystal shutter-elements as the beam-manipulating elements in a polarization diversity scheme.

Those skilled in the art will recognize that in the present invention, the beam-manipulating elements may be alternatively provided by other beam-manipulating means known in the art, such as shutter-like elements that act as optical shutters. FIG. 4A shows a schematic side view of a fourth embodiment of an optical spectral power monitoring apparatus according to the present invention, employing an array of liquid crystal (LC) shutter-elements 440 as the beam-manipulating elements in a polarization diversity scheme. By way of example, optical spectral power monitoring apparatus 400A may make use of the general architecture as well as a number of the elements used in the embodiment of FIG. 3, as indicated by those elements labeled with identical numerals. As in the case of FIG. 3, the input port 110 transmits a multi-wavelength optical signal (which may contain wavelengths $\lambda_1$ through $\lambda_N$, for instance). The polarization-separating element 360 may decompose the input multi-wavelength optical signal into a p-polarization component and an s-polarization component (or first and second polarization components). The polarization-rotating element 370 may rotate the s-polarization component (or the second polarization component) by 90-degrees. The diffraction grating 120 subsequently separates the incident optical signals by wavelength respectively into first and second sets of optical beams (wherein each group may contain optical beams with wavelengths $\lambda_1$ through $\lambda_N$, for instance), impinging onto an array of beam-manipulating elements 440 which may comprise LC shutter-elements (see FIG. 4B below for further detail). Note that the first or second set of optical beams are dispersed in a direction substantially perpendicular to the plane of paper, hence not explicitly shown in the side view of FIG. 4A. The focusing lens 130 may focus the first and second optical beams associated with the same wavelength (e.g., $\lambda_i$) onto the same LC shutter-element (e.g., an LC shutter-element 440-$i$ shown in FIG. 4B). The optical spectral power monitoring apparatus 400A may further include an optical detector 450, in optical communication with the LC shutter-element array 440.

Figure 4B:
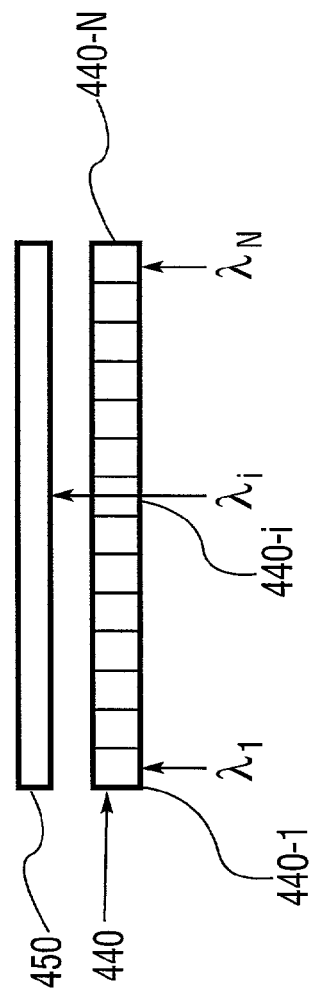

FIG. 4B depicts a schematic top view of the LC shutter-element array 440 including LC shutter-elements 440-1 through 440-N, along with the optical detector 450. Notice that in this schematic top view, only one set of optical beams (e.g., the second set of optical beams) is explicitly shown. The LC shutter-elements 440-1 through 440-N may be configured to function as optical shutters. For instance, each LC shutter-element may comprise a liquid crystal rotator that rotates the polarization of an incident optical beam by 90-degrees in the absence of any control signal and leaves the polarization unchanged under an appropriate electrical control signal, in conjunction with a polarizer whose polarization axis is perpendicular to the thus-rotated polarization produced by the liquid crystal rotator. As a result, each LC shutter-element permits the corresponding optical beams to pass when subject to an appropriate control signal; and remains "closed" to the incident optical beams in the absence of any control signal. By way of example in FIG. 4B, the LC shutter-element 440-$i$ allows the corresponding first and second beams with wavelength $\lambda_i$ to pass into the optical detector 450, while the remaining LC shutter-elements are "closed" to their respective optical beams, as illustrated in the figure. Thus, by controlling the LC shutter-elements 440-1 through 440-N according to a desired time-division-multiplexed scheme, the first and second optical beams associated with each wavelength may pass into the optical detector 450 successively, e.g., in a manner substantially similar to that described with respect to FIG. 1. And the detection time allocated for the optical beams associated with each wavelength may be fixed, or dynamically controlled on a wavelength-by-wavelength basis, by controlling the amount of time during which the corresponding LC shutter-element stays open. As such, an optical power spectrum of the input multi-wavelength optical signal can be obtained in the embodiment of FIG. 4A. (It will be appreciated that the associated actuation/control system for providing control signals to the LC shutter-elements 440-1 through 440-N are known to those skilled in the art, and hence are not explicitly shown in FIG. 4A.)

Figure 4C:
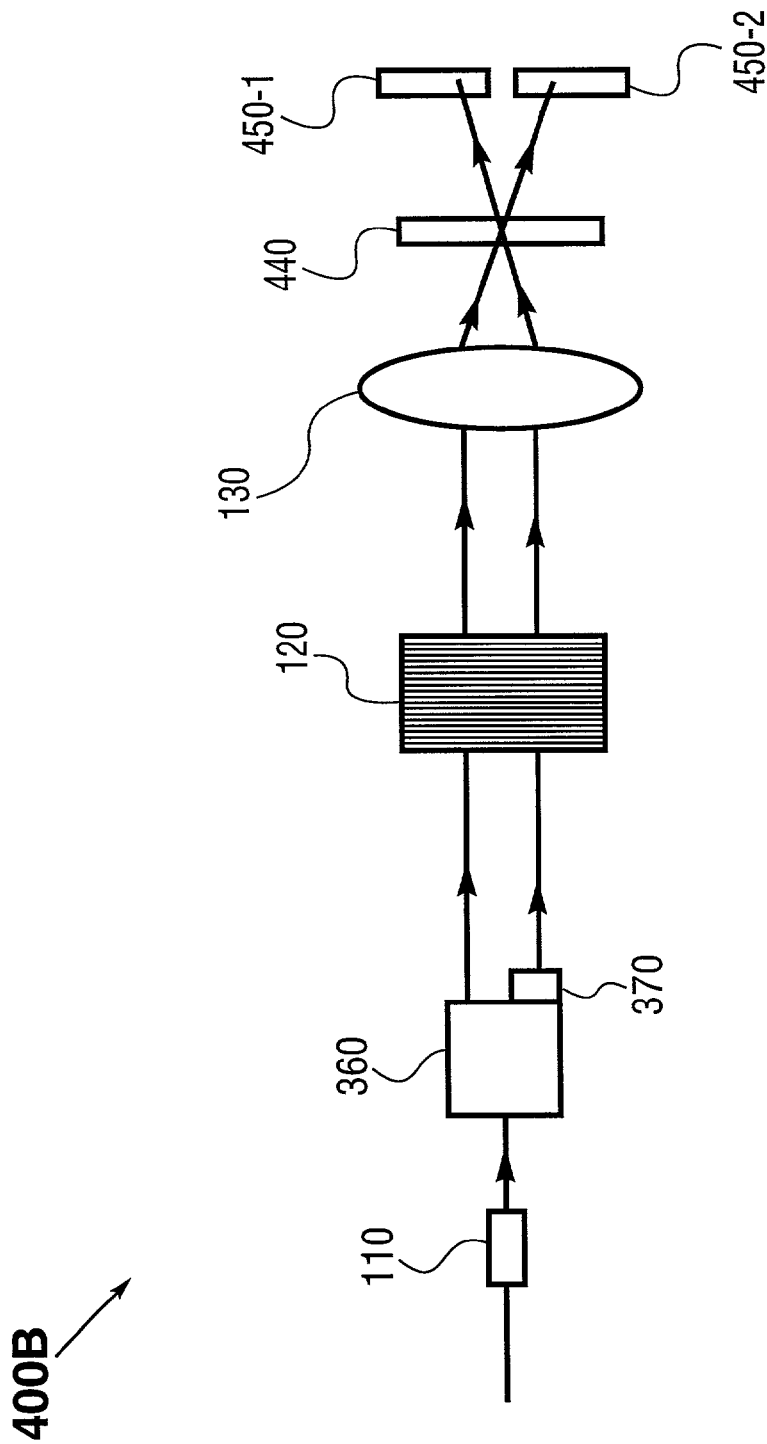
FIG. 4C shows a fifth embodiment of an optical spectral power monitoring apparatus of the present invention, each employing an array of liquid crystal shutter-elements as the beam-manipulating elements in a polarization diversity scheme.

The embodiment of FIG. 4A may be further modified to provide an optical power spectrum associated with each polarization component in the input multi-wavelength optical signal, if so desired in a given application. FIG. 4C depicts a schematic side view of a fifth embodiment of an optical spectral power monitoring apparatus of the present invention, pertaining to this situation. By way of example, optical spectral power monitoring apparatus 400B may make use of the general architecture as well as a number of the elements used in the embodiment of FIG. 4A, as indicated by those elements labeled with identical numerals. In this case, the first and second optical beams passing through each LC shutter-element (e.g., 440-$i$) may impinge onto two separate optical detectors, e.g., first and second optical detectors 450-1, 450-2, respectively. In this way, by controlling the LC shutter-elements 440 according to a desired time-division-multiplexed scheme, an optical power spectrum associated with each polarization component in the input multi-wavelength signal may be provided by the respective first and second optical detectors 450-1, 450-2.

One skilled in the art will appreciate that the beam-manipulating elements 440 in the embodiment of FIG. 4A (or 4C) may be alternatively provided by MEMS (micro-electro-mechanical-system) based shutter-elements, LC shutter-elements that function as optical shutters in a polarization-independent fashion, or other types of optical shutters known in the art that can be dynamically controlled on an individual basis. It will be further appreciated that MEMS shutter-elements, or LC shutter-elements (e.g., polarization-independent types), may also be employed as the beam-manipulating elements in the embodiment of FIG. 1, in lieu of the micromirrors.

In the present invention, the polarization-separating element 360 may be a polarizing beam splitter (in conjunction with a suitable beam-deflector or prism, such that the incident and emerging optical beams remain parallel), a birefringent beam displacer, or other types of polarization-separating means known in the art. The polarization-rotating element 370 may be a half-wave plate, a Faraday rotator, a liquid crystal rotator, or any other polarization-rotating means known in the art that is capable of rotating the polarization of an optical beam by a prescribed angle (e.g., 90-degrees). The wavelength-disperser 120 may generally be a ruled diffraction grating, a holographic diffraction grating, or an echelle grating, a transmission grating, a dispersing prism, or other types of wavelength-separating means known in the art. The beam-focuser 130 may generally be an assembly of one or more focusing lenses, or other types of beam-focusing means known in the art. The focusing function may also be accomplished by using a curved diffraction grating that performs a dual function of wavelength-separating and beam-focusing. An input port (e.g., the input port 110 of FIG. 1) may be a fiber collimator, coupled to an input fiber (e.g., a single mode fiber) transmitting an input optical signal. For the ease of alignment, the fiber collimators providing multiple input ports (e.g., the input ports 210-1 through 210-K in the embodiment of FIG. 2) may be conveniently mounted in a V-groove fabricated on a substrate made of silicon, plastic, or ceramic, as commonly practiced in the art. Furthermore, an optical detector in any of the above embodiments may be a PN photo detector, a PIN photo detector, an avalanche photo detector (APD), or other types of optical power sensing means known in the art. From the teachings of this specification, one skilled in the art will know how to design a suitable optical spectral power monitoring apparatus according to the present invention, for a given application.

Figure 5:
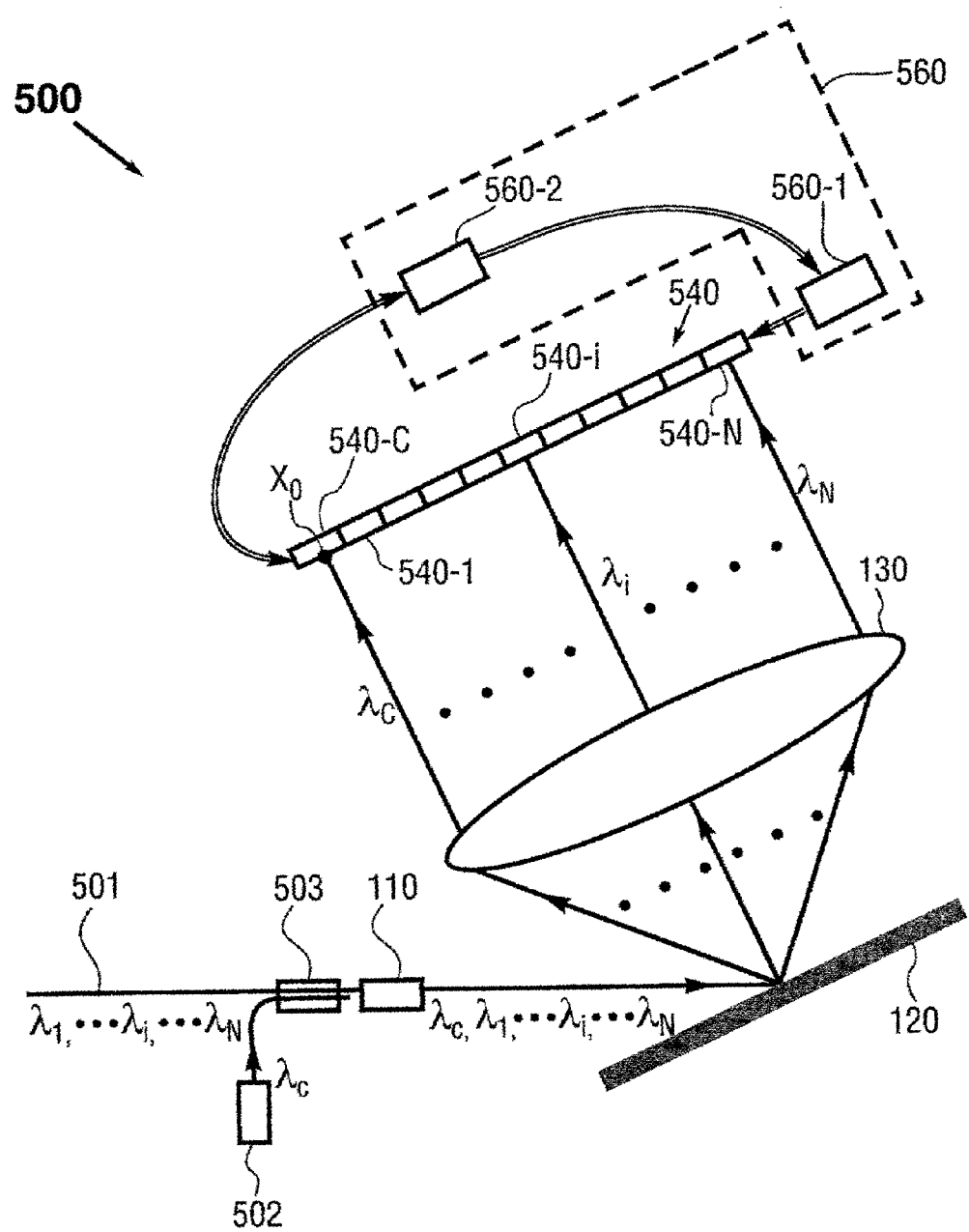
FIG. 5 shows a sixth embodiment of an optical spectral power monitoring apparatus of the present invention, illustrating how to ascertain optimal alignment in the present invention.

To ensure the requisite alignment between the spectral channels and the respective beam-manipulating elements (i.e., the micromirrors 140-1 through 140-N in FIG. 1), an optical spectral power monitoring apparatus of the present invention may make use of one or more reference signals and corresponding reference-position-sensing elements, along with appropriate alignment-adjusting elements, to monitor the alignment between the spectral channels and the respective beam-manipulating elements and to correct for misalignment that may occur over the course of operation. FIG. 5 depicts a schematic top view of a sixth embodiment of an optical spectral power monitoring apparatus of the present invention. By way of example, optical spectral power monitoring apparatus 500 may make use of the general architecture and a number of the elements used in the embodiment of FIG. 1, as indicated by those elements labeled with identical numerals. The following description will use this system as an example to illustrate how to ascertain and further maintain the requisite alignment between the spectral channels and the respective beam-manipulating elements. The operation of the embodiment of FIG. 5 as an optical spectral power monitoring device may be substantially as described above (e.g., the embodiment of FIG. 1). (Hence, some elements, such as optical detector(s), are not explicitly shown in FIG. 5.)

In the optical spectral power monitoring apparatus 500, the input port 110 transmits a multi-wavelength optical signal containing wavelengths $\lambda_1$ through $\lambda_N$ along with a reference signal containing wavelength $\lambda_c$. The diffraction grating 120 angularly separates the incident multi-wavelength optical signal along with the reference signal by wavelength into multiple spectral channels $\lambda_1$ through $\lambda_N$ and a reference spectral component $\lambda_c$ having a predetermined relative arrangement. The focusing lens 130 may focus the reference spectral component and the spectral channels into corresponding focused spots, e.g., in a predetermined spatial array with the predetermined relative arrangement. An optical-element array 540, including a reference-position-sensing element 540-C and a plurality of beam-manipulating elements 540-1 through 540-N (e.g., the micromirrors 140-1 through 140-N in FIG. 1), may be positioned such that when the reference spectral component $\lambda_c$ impinges onto the reference-position-sensing element 540-C at a predetermined location $x_o$, the spectral channels $\lambda_1$ through $\lambda_N$ impinge onto the beam-manipulating elements 540-1 through 540-N, respectively, in accordance with a requisite alignment. This provides a simple and effective way to align the spectral channels with the respective beam-manipulating elements. It should be appreciated that the diffracted optical beams impinging onto the optical-element array 540 may be unevenly spaced. Further, the optical-element array 540 may be integrated into a single structure, e.g., by mounting and/or fabricating the constituent elements on a substrate.

The optical spectral power monitoring apparatus 500 of FIG. 5 may further comprise an alignment-adjusting element 560-1 which in one form may be an actuation device coupled to the optical-element array 540, for causing the optical-element array 540 as a whole—therefore the reference-position-sensing element 540-C and the beam-manipulating elements 540-1 through 540-N in tandem—to move (e.g., translate and/or rotate), thereby adjusting a relative alignment between the spectral array formed by the diffracted optical beams and the underlying optical-element array. The optical spectral power monitoring apparatus 500 may additionally include a processing element 560-2, for monitoring the real-time impinging position of the reference spectral component $\lambda_c$ on the reference-position-sensing element 540-C and for controlling the actuation device 560-1 accordingly. This ensures that the reference spectral component $\lambda_c$ stays aligned at the predetermined location $x_o$, thereby maintaining the requisite alignment between the spectral channels $\lambda_1$ through $\lambda_N$ and the beam-manipulating elements 540-1 through 540-N. The thus-described alignment-monitoring-adjusting process may be carried out periodically, or continuously by way of servo-control. (In the latter scenario, the actuation device 560-1 and the processing element 560-2 may function as a servo-control unit 560.) The optical spectral power monitoring apparatus 500 thus is capable of actively correcting for misalignment that may occur over the course of operation (e.g., due to environmental effects such as thermal and/or mechanical disturbances), and therefore provides a more robust performance.

In the embodiment of FIG. 5, the reference-position-sensing element 540-C may be a position sensitive detector, a quadrant detector, a split detector, or any other position-sensitive means known in the art, which allows the real-time impinging position (in one or two dimensions) of an optical beam to be monitored by way of electrical (e.g., current or voltage) signals produced by the sensing element. The actuation device 560-1 may be a voice coil actuator, a stepping motor, a solenoid actuator, a piezoelectric actuator, or other types of actuation means known in the art. The processing element 560-2 may include electrical circuits, controllers and signal processing algorithms for processing the output signals received from the reference-position-sensing element 540-C and deriving from the detected signals the real-time impinging position of the reference spectral component $\lambda_c$. The processing element 560-2 accordingly generates appropriate control signals to be applied to the actuation device 560-1.

A skilled artisan will appreciate that instead of (or in conjunction with) of moving the optical-element array 540 relative to the spectral array as described above, the focusing lens 130 in FIG. 5 may be alternatively (or additionally) moved (e.g., translated or rotated), thereby performing a similar alignment function. From the teachings of the present invention, those skilled in the art will further appreciate that one or more auxiliary reference signals and corresponding reference-position-sensing elements, along with suitable alignment-adjusting elements, may be additionally employed in an optical spectral power monitoring apparatus of the present invention to complement the aforementioned function of the reference spectral component $\lambda_c$.

In the present invention, one or more reference signals may generally be any optical signals with well-defined and stable center wavelengths that do not substantially coincide with any of the wavelengths of the spectral channels under consideration. By way of example, the reference signal in FIG. 5 is shown to have a wavelength $\lambda_c$ that is shorter (or longer) than the wavelengths of the spectral channels. In general, the spectral channels need not be evenly spaced in wavelength (or frequency).

In the embodiment of FIG. 5, the multi-wavelength optical signal containing wavelengths $\lambda_1$ through $\lambda_N$ may be provided by an input optical fiber 501 coupled to the fiber collimator that serves as the input port 110. The reference signal $\lambda_c$ may be provided by a reference light source 502, which may be a distributed feedback (DFB) laser, a suitable Fabry-Perot (FP) laser, or any other light source known in the art that can provide an appropriate reference signal with a well-defined and stable center wavelength. An optical combiner 503 (e.g., a fiber-optic fused coupler) may be used to couple the reference light source 502 to the input optical fiber 501, effective to direct both the multi-wavelength optical signal and the reference signal into the input port 110. The optical spectral power monitoring apparatus 500 thus has an independent, internal reference light source. (In the event that one or more auxiliary reference signals are employed in the present invention, one or more auxiliary reference light sources may be coupled to the input fiber 501 by way of one or more auxiliary optical combiners in a similar manner; or a single reference light source capable of providing a plurality of distinct reference signals may be implemented, in lieu of the reference light source 502.) Alternatively, the multi-wavelength optical signal itself may include one or more spectral components (e.g., one or more service channels in an optical network) that can serve as one or more reference signals, as in WDM optical networking applications. In such scenario, the internal reference light source 502 along with the fiber-optic coupler 503 need not be implemented.

From the teachings of the present invention with respect to FIG. 5, a skilled artisan will know how to implement an appropriate alignment-monitoring-adjusting scheme in an optical spectral power monitoring apparatus employing a polarization diversity scheme (e.g., the embodiment of FIG. 3, 4A or 4C). For instance, by impinging the first and second optical beams originating from the p-polarization and s-polarization components of the reference signal $\lambda_c$ onto substantially the same location (e.g., $x_o$ in FIG. 5) on the reference-position-sensing element 540-C, the subsequent alignment monitoring and adjusting may be performed in substantially the same way as described above with respect to FIG. 5. Furthermore, in the event that a plurality of input ports are implemented in an optical spectral power monitoring apparatus (e.g., the embodiment of FIG. 2), a plurality of reference signals may be utilized and transmitted from the input ports (e.g., in a one-to-one correspondence), along with the respective input optical signals. A plurality of reference-position-sensing elements may be accordingly implemented, e.g., each corresponding to a unique one of the reference signals. As such, each reference signal, in conjunction with the corresponding reference-position-sensing element, may be designated for monitoring the alignment between the spectral array formed by the corresponding input optical signal (with which the reference signal emerges from an input port) and the underlying beam-manipulating elements, in a way substantially similar to that described in FIG. 5.

Those skilled in the art will recognize that the exemplary embodiments described above provide only a few of many optical spectral power monitoring systems that can be constructed according to the present invention. Various means and methods can be devised to perform the designated functions in an equivalent manner. Moreover, various changes, substitutions, and alternations can be made herein without departing from the principles and the scope of the invention. Accordingly, the scope of the present invention should be determined by the following claims and their legal equivalents.

What is claimed is:

1. An optical apparatus, comprising:
   a) an input port, providing a multi-wavelength optical signal;
   b) a wavelength-disperser that separates said multi-wavelength optical signal by wavelength into multiple spectral channels having a predetermined relative arrangement;
   c) an array of beam-manipulating elements positioned to correspond with said spectral channels; and
   d) an array of optical detectors, including a plurality of optical detectors each corresponding to a unique one of said spectral channels;

wherein said beam-manipulating elements are individually controllable, so as to be capable of directing spectral channels into said array of optical detectors concurrently and capable of directing spectral channels into said array of optical detectors in a time-division-multiplexed sequence.

2. The optical apparatus of claim 1 wherein said beam-manipulating elements comprise micromirrors.

3. The optical apparatus of claim 2 wherein said micromirrors comprise silicon micromachined mirrors.

4. The optical apparatus of claim 2 wherein each micromirror is pivotable about at least one axis.

5. The optical apparatus of claim 1 wherein said beam-manipulating elements comprise MEMS (micro-electro-mechanical-system) shutter-elements.

6. The optical apparatus of claim 1 wherein said beam-manipulating elements comprise liquid crystal shutter-elements.

7. The optical apparatus of claim 1 wherein said wavelength-disperser comprises an element selected from the group consisting of ruled diffraction gratings, curved diffraction gratings, holographic diffraction gratings, echelle gratings, transmission gratings, and dispersing prisms.

8. The optical apparatus of claim 1 wherein said array of optical detectors comprises an element selected from the group consisting of PN photo detectors, PIN photo detectors, and avalanche photo detectors.

9. The optical apparatus of claim 1 wherein said input port comprises a fiber collimator, coupled to an input optical fiber transmitting said multi-wavelength optical signal.

10. The optical apparatus of claim 9 wherein said input optical fiber is a single mode fiber.

11. The optical apparatus of claim 1 further comprising a beam-focuser for focusing said spectral channels into corresponding focused spots that impinge onto said beam-manipulating elements.

12. The optical apparatus of claim 1 further comprising a reference signal, emerging from said input port along with said multi-wavelength optical signal, wherein said wavelength-disperser directs a reference spectral component of said reference signal to a predetermined location on a reference-position-sensing element.

13. The optical apparatus of claim 12 wherein said reference-position-sensing element comprises an element selected from the group consisting of position sensitive detectors, quadrant detectors, and split detectors.

14. The optical apparatus of claim 12 wherein said input port comprises a fiber collimator coupled to an input optical fiber, wherein said optical apparatus further comprises an optical combiner for coupling a reference light source to said input optical fiber, and wherein said input optical fiber transmits said multi-wavelength optical signal and said reference light source provides said reference signal.

15. The optical apparatus of claim 12 further comprising an alignment-adjusting element for adjusting an alignment between said spectral channels and said beam-manipulating elements.

16. The optical apparatus of claim 15 wherein said beam-manipulating elements and said reference-position-sensing element form an optical-element array, and wherein said alignment-adjusting element comprises an actuation device coupled to said optical-element array, for causing said optical-element array to move.

17. The optical apparatus of claim 15 further comprising a processing element in communication with said alignment-adjusting element and said reference-position-sensing element, wherein said processing element monitors an impinging position of said reference spectral component onto said reference-position-sensing element and provides control of said alignment-adjusting element accordingly, so as to maintain said reference spectral component at said predetermined location, thereby ensuring a requisite alignment between said spectral channels and said beam-manipulating elements.

18. An optical apparatus, comprising:
a) an input port, providing a multi-wavelength optical signal;
b) a polarization-separating element that decomposes said multi-wavelength optical signal into first and second polarization components;
c) a polarization-rotating element that rotates a polarization of said second polarization component by approximately 90-degrees;
d) a wavelength-disperser that separates said first and second polarization components by wavelength respectively into first and second sets of optical beams;
e) a beam-focuser that focuses first and second sets of optical beams into corresponding focused spots;
f) an array of beam-manipulating elements positioned to correspond with said first and second sets of optical beams; and
g) at least one array of optical detectors for monitoring power associated with said first and second polarization components;
wherein said beam-manipulating elements are individually controllable, so as to be capable of directing some of said optical beams into said at least one array of optical detectors concurrently and capable of directing some of said optical beams into said at least one array of optical detectors in a time-division-multiplexed sequence.

19. The optical apparatus of claim 18 wherein said beam-manipulating elements comprise micromirrors.

20. The optical apparatus of claim 19 wherein said micromirrors comprise silicon micromachined mirrors.

21. The optical apparatus of claim 19 wherein each micromirror is pivotable about at least one axis.

22. The optical apparatus of claim 18 wherein said beam-manipulating elements comprise liquid crystal shutter-elements.

23. The optical apparatus of claim 18 wherein said beam-manipulating elements comprise MEMS shutter-elements.

24. The optical apparatus of claim 18 wherein said polarization-separating element comprises an element selected from the group consisting of polarizing beam splitters and birefringent beam displacers.

25. The optical apparatus of claim 18 wherein said polarization-rotating element comprises an element selected from the group consisting of half-wave plates, liquid crystal rotators, and Faraday rotators.

26. The optical apparatus of claim 18 wherein said wavelength-disperser comprises an element selected from the group consisting of ruled diffraction gratings, holographic diffraction gratings, echelle gratings, curved diffraction gratings, transmission gratings, and dispersing prisms.

27. The optical apparatus of claim 18 wherein said beam-focuser comprises at least one focusing lens.

28. The optical apparatus of claim 18 wherein said input port comprises a fiber collimator.

29. The optical apparatus of claim 18 wherein said at least one array of optical detectors comprises a single array of optical detectors.

30. The optical apparatus of claim 18 wherein said at least one array of optical detectors comprises at least one element selected from the group consisting of PN photo-detectors, PIN photo detectors, and avalanche photo detectors.

31. A method of spectral power monitoring, comprising:
a) providing a multi-wavelength optical signal;
b) separating said multi-wavelength optical signal by wavelength into multiple spectral channels; and
c) selectively directing said spectral channels into an array of optical detectors, such that some of said spectral channels are capable of being received by said optical detectors concurrently and some of said spectral channels are capable of being received by said optical detectors in a time-division-multiplexed sequence.

32. The method of claim 31 wherein said step c) is carried out by way of an array of micromirrors that are individually movable.

33. A method of optical spectral power monitoring, comprising:
   a) providing a multi-wavelength optical signal;
   b) decomposing said multi-wavelength optical signal into first and second polarization components;
   c) rotating a polarization of said second polarization component by approximately 90-degrees;
   d) separating said first and second polarization components by wavelength respectively into first and second sets of optical beams;
   e) focusing said first and second sets of optical beams into corresponding focused spots;
   f) impinging said first and second sets of optical beams onto an array of beam-manipulating elements; and
   g) individually controlling said beam-manipulating elements, such that some of said optical beams are capable of being directed into at least one array of optical detectors concurrently and some of said optical beams are capable of being directed into said at least one array of optical detectors in a time-division-multiplexed sequence, whereby said at least one array of optical detectors monitors power associated with said first and second polarization components.

* * * * *